United States Patent [19]

Lienert et al.

[11] 3,984,365
[45] Oct. 5, 1976

[54] STABILIZED AQUEOUS SOLUTION OF A BISULPHITE BLOCKED POLYISOCYANATE

[75] Inventors: Hans-Jürgen Lienert, Cologne; Hans Schuster, Schildgen; Karl Schäfer, Opladen; Friedrich Reich, Leverkusen, all of Germany

[73] Assignee: Bayer Aktiengesellschaft, Leverkusen, Germany

[22] Filed: Mar. 24, 1975

[21] Appl. No.: 561,399

[30] Foreign Application Priority Data
Mar. 26, 1974 Germany............................ 2414470

[52] U.S. Cl............................ 260/29.2 TN; 8/127.6; 8/128 A; 162/164; 260/29.4 R; 260/77.5 TB
[51] Int. Cl.²................. C08L 75/04; D06M 13/42; D06M 15/12
[58] Field of Search ............. 260/29.2 TN, 77.5 TB

[56] References Cited
UNITED STATES PATENTS

| | | | |
|---|---|---|---|
| 2,710,816 | 6/1955 | Evans et al. ................. | 260/77.5 TB |
| 2,746,988 | 5/1956 | Doser ......................... | 260/29.2 TN |
| 3,491,067 | 1/1970 | Sellet.......................... | 260/29.2 TN |
| 3,898,197 | 8/1975 | Guise et al. ................. | 260/29.2 TN |

Primary Examiner—Murray Tillman
Assistant Examiner—Arthur H. Koeckert
Attorney, Agent, or Firm—Frederick H. Colen; Lawrence S. Pope; Gene Harsh

[57] ABSTRACT

An aqueous solution of bisulphite blocked polyisocyanate prepolymers is imparted improved storage stability at temperatures up to about 45° C by incorporation of about 0.5 to 20% by weight (based on the weight of bisulphite blocked prepolymer) of an aromatic or alkyl aromatic sulphonic acid of the formula:

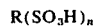

$R(SO_3H)_n$ wherein R is an aromatic or alkyl aromatic hydrocarbon group having 6 to 15 carbon atoms and $n$ is an integer from 1 to 3. The solution may also contain up to 80 volume percent (based on the total quantity of solvent) of an organic solvent miscible with water and having a boiling point below about 150°C. This solution may be used to finish paper, leather or textiles and to shrink proof keratin containing textiles.

5 Claims, No Drawings

STABILIZED AQUEOUS SOLUTION OF A BISULPHITE BLOCKED POLYISOCYANATE

FIELD OF THE INVENTION

This invention relates to new stabilized aqueous solutions of bisulphite blocked NCO prepolymers and their use for finishing textiles, leather and paper.

BACKGROUND OF THE INVENTION

Bisulphite blocked NCO prepolymers in aqueous solutions and their use for shrink proofing materials which contain keratin are known in the art. These known substances have numerous important advantages. They are sufficiently water-soluble to be used in the form of aqueous solutions and yet they have the advantage of increasing the water repellence of keratin-containing material treated with them. Another advantage of bisulphite blocked NCO prepolymers is the solubility of the blocking agent in water and the consequent ease with which it may be washed-out of the treated material. In addition, compared with phenols which are otherwise preferably used as blocking agents in polyurethane chemistry, the bisulphites are substantially physiologically harmless substances.

A serious disadvantage of the aqueous solutions of bisulphite addition products used as shrink proofing agents such as those described in German OS No. 2,307,563 and South African Pat. No. 73,868, is their insufficient stability in storage, particularly at elevated temperatures, e.g. from 40° to 50°C. When ready for use, shrink proofing substances are often stored for many weeks or months in the open under summer or even subtropical conditions before they are used, in particular, for the treatment of wool. This consideration is particularly important for tropical countries but should not be underestimated for mid-European countries. The shrink proofing agents described in German OS No. 2,307,563 and South African Pat. No. 73,868 have the disadvantage of becoming unusable after only a few days at temperatures above 30°C. This is due to the insufficient stability of the bisulphite adducts in the presence of water (phase separation and gelling occur).

SUMMARY OF THE INVENTION

It has now surprisingly been found that the stability of the aqueous solutions may be significantly improved by adding particular quantities of certain aromatic sulphonic acids to the solution. This discovery is extremely surprising since no such stabilizing affect is obtained by the addition of other acids of comparable acidity, such as formic acid, tartaric acid, chloroacetic acid, bromoacetic acid or acetic acid.

This invention therefore, relates to an aqueous solution of a water soluble polyisocyanate prepolymer whose isocyanate groups are blocked with bisulphite. This solution may be stored without decomposition at 45°C for at least 10 weeks. This solution contains from about 0.5 to 20% by weight, based on the bisulphite blocked polyisocyanate, of an acid corresponding to the following general formula:

$$R(SO_3H)_n$$

wherein R represent an aromatic or alkyl aromatic hydrocarbon group containing 6 to 15 carbon atoms; and $n$ is an integer of from 1 to 3.

The solution also contains 0 to 80 volume percent based on the total quantity of solvent, of a water miscible organic solvent with a boiling point below 150°C.

The invention also relates to the use of this solution for finishing textiles, paper and leather.

DETAILED DESCRIPTION OF THE INVENTION

The bisulphite addition products which are to be stabilized according to the invention are compounds prepared in conventional manner by reacting excess quantities of polyisocyanates with polyhydroxyl compounds and then blocking the resulting NCO prepolymers with bisulphite, in particular with sodium or potassium bisulphite.

The polyhydroxyl compounds may be polyesters, polyethers or polycarbonates with at least 2, preferably 2 or 3, terminal hydroxyl groups and a molecular weight of from 500 to 10000.

Representatives of these compounds used according to the invention have been described, e.g. in High Polymers, Vol. XVI, "Polyurethanes, Chemistry and Technology", published by Saunders-Frisch, Interscience Publishers, New York London, Volume I, 1962, pages 32 – 42 and pages 44 – 54 and Volume II, 1964, pages 5 – 6 and 198 – 199 and in Kunstoff-Handbuch, Volume VII, Vieweg-Höchtlen, Carl-Hanser-Verlag, Munich, 1966, e.g. on pages 45 to 71.

Suitable polyesters with hydroxyl groups include, e.g. the reaction products of polyvalent, preferably divalent, alcohols, with the optional addition of trivalent alcohols, and polybasic, preferably dibasic, carboxylic acids. Instead of the free polycarboxylic acids, the corresponding polycarboxylic acid anhydrides or esters with lower alcohols or mixtures thereof may be used for preparing the polyesters. The polycarboxylic acids may be aliphatic, cycloaliphatic, aromatic and/or heterocyclic and may be substituted, e.g. with halogen atoms, and/or may be unsaturated. The following are examples: oxalic acid, malonic acid, succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride and fumaric acid. The following are examples of suitable polyhydric alcohols, used either separately or as mixtures: ethylene glycol, propylene-1,2— and —1,3-glycol, butylene-1,4— and —2,3-glycol, hexane— 1,6-diol, octane-1,8-diol, neopentylglycol, cyclohexane dimethanol (1,4-bis-hydroxymethylcyclohexane), 2-methyl-1,3-propanediol, glycerol, trimethylolpropane, hexane-1,2,6-triol, butane-1,2,4-triol, trimethylolethane, pentaerythritol, diethyleneglycol, triethyleneglycol, tetraethyleneglycol, polyethyleneglycols, dipropyleneglycol, polypropyleneglycols, dibutylene glycol and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

The polycarbonates with hydroxyl groups used may be those known per se, for example those which may be obtained by reacting diols, such as propane-1,3-diol, butane-1,4-diol and/or hexane-1,6-diol, ethylene glycol, diethyleneglycol, triethyleneglycol, or tetraethyleneglycol, with diarylcarbonates, e.g. diphenylcarbonate or phosgene.

Suitable polyhydroxyl compounds for preparing this compound are in particular di- or tri-functional polyhydroxypolyethers with molecular weights of from 500 to 10,000 preferably from 1000 to 5000 which may be obtained in conventional manner alkoxylating di- or tri-functional initiators, such as water, ethylene glycol, propane-1,2-diol, propane-1,3-diol, trimethylol-propane or glycerol. The preparation of such polyethers is taught in Polyurethane: Chemistry and Technology, Volume 1 by Saunders and Frisch, Interscience Publishers (1962) pages 32–40. It is preferred to use those polyethers which have been alkoxylated exclusively with propylene oxide or with propylene oxide together with up to 50 mols percent of ethylene oxide, based on the total quantity of alkylene oxide. The so-called "mixed polyethers" may either contain the propylene oxide and ethylene oxide unit in statistical distribution or they may be block polyethers, known per se, which contain polypropylene oxide and polyethylene oxide blocks. stabilized according to the invention one may use aliphatic, cycloaliphatic, araliphatic, aromatic or heterocyclic polyisocyanates of the type which have been described, e.g. by W. Siefken in Justus Liebigs Annalen der Chemie, 562, pages 75 to 136, for example ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and mixtures of these isomers, 1-isocyanato-3,3,5-trimethyl-5-isocyanatomethylcyclohexane, hexahydrotolylene-2,4- and -2,6-diisocyanate and mixtures of these isomers, hexahydrophenylene-1,3- and/or -1,4diisocyanate, perhydrodiphenylmethane-2,4'- and/or 4,4'-diisocyanate, phenylene-1,3- and -1,4-diisocyanate, tolylene-2,4- and -2,6-diisocyanate and mixtures of these isomers, diphenylmethane-2,4'- and/or 4,4'-diisocyanate, naphthylene-1,5-diisocyanate, triphenylmethane-4,4',-4''-triisocyanate, polyphenyl-polymethylene-polyisocyanates which may be obtained by aniline-formaldehyde condensation followed by phosgenation and which have been described, e.g. in British patent specification Nos. 874,430 and 848,671, the diisocyanates according to U.S. Pat. specification No. 3,492, 330, polyisocyanates which contain allophanate groups as described, e.g. in British patent specification No. 994,890, Belgian patent specification No. 761,626 and published Dutch Pat. application No. 7102524, polyisocyanates which contain isocyanurate groups as described, e.g. in German Pat. specification Nos. 1,022,789; 1,222,067 and 1,027,394 and in German Offenlegungsschriften Nos. 1,929,034 and 2,004,048, polyisocyanates which contain urethane groups as described, e.g. in Belgian patent specification No. 752,261 or in U.S. Pat. specification No. 3,394,164, polyisocyanates which contain acylated urea groups according to German Pat. specification No. 1,230,778, polyisocyanates which contain biuret groups as described, e.g. in German Pat. specification No. 1,101,394, in British patent specification No. 889,050 and in French Pat. specification No. 7,017,514, polyisocyanates prepared by telomerisatiom reactions, e.g. according to Belgian Pat. specification No. 723,640, polyisocyanates which contain ester groups as mentioned, e.g. in British patent specification Nos. 956,474 and 1,072,956, in U.S. Pat. specification No. 3,567,763 and in German Pat. specification No. 1,231,688 and reaction products of the above-mentioned isocyanates with acetals according to German Pat. specification No. 1,072,385. Mixtures of the above-mentioned polyisocyanates may also be used.

The polyisocyanates used for preparing the NCO prepolymers are preferably aliphatic, cycloaliphatic and araliphatic polyisocyanates, such as hexamethylene diisocyanate, 2,4-diisocyanato-hexahydrotoluene, 1,4-diisocyanato-cyclohexane, 4,4'-diisocyanato-dicylcohexylmethane, 1-isocyanato-3,3,5-trimethyl-5-isocyanatomethyl-cyclohexane or p-xylylene diisocyanate.

The NCO prepolymers are prepared in conventional manner by reacting excess quantities of the diisocyanate (e.g. a 2 to 10 times molar excess) with the polyhydroxypolyether, optionally followed by removal of excess, unreacted polyisocyanate.

Blocking of the resulting NCO prepolymers with the sodium or potassium bisulphite may be carried out, for example, by dissolving the prepolymer in an organic solvent which is compatible with water and then adding an aqueous solution of the bisulphite to this solution. The organic solvent used may be removed from the resulting aqueous solution by distillation if desired. Even when hydrophobic polyethers are used which contain mainly polypropylene oxide units, the hydrophilic, bisulphite blocked isocyanate group generally ensures sufficient solubility of the product in water. If necessary however, the organic solvent is not completely removed or additional organic solvent is added to the system. The individual components are generally used in such proportions that the aqueous solution which is to be stabilized in accordance with the invention contains from 20 to 80%, by weight, of solid substance and from 80 to 20% by weight, of solvent, which may be either pure water or a mixture of water with up to 80 volume percent of organic solvent. Suitable solvents are, in particular, those solvents compatible with water which have a boiling point below 150°C, for example, ethyl acetate, acetone, ethanol and isopropanol.

An essential feature of the invention is the stabilization of the resulting aqueous solution by the addition of from 0.5 to 20% by weight, preferably from 1 to 10% by weight, based on the bisulphite addition product, of an acid corresponding to the formula:

R(SO₃H)ₙ wherein

R represents an aromatic or alkyl aromatic hydrocarbon group containing from 6 to 15 carbon atoms; and n is an integer of from 1 to 3, preferably 1. Examples of such acids include: benzenesulphonic acid, α-naphthalenesulphonic acid, p-toluenesulphonic acid, p-hexylbenzene sulphonic acid, benzene-1,3-disulphonic acid and naphthalene-trisulphonic acids. The preferred sulphonic acid is p-toluenesulphonic acid.

To carry out the stabilization according to the invention, the acid is simply added to the aqueous solution of the bisulphite addition product. This stabilization according to the invention results in a very substantial increase in the stability of the solutions in storage at 45°C. Whereas unstabilized solutions become unstable and often show signs of gelling or phase separation after less than one week's storage, the stabilization according to the invention enables aqueous solutions of the bisulphite addition product to be prepared which may generally be stored unchanged for more than six months at 45°C.

Solutions which have been stabilized according to the invention are suitable for finishing textiles, paper and leather, and like the solutions described in German OS No. 2,307,563, for example, they are suitable for shrink proofing keratin containing textiles. The textiles which is to be treated, for example, wool, is impregnated with the stabilized solutions according to this invention by, e.g. padding, immersion, spraying or spread coating, Examples 6 to 12 are comparison examples. The figures given for the stability in storage at 45°C indicates the time after which no external change (viscosity, cloudiness) may be detected. The solutions from Examples 6 to 12 formed an unusable gel after the given times. The percentages, by weight, given in the Table are based on the total quantity of the ready-for-use solution.

TABLE

| Example No. | Solid substance (% by weight) | Acid | % by weight, acid | Isopropanol (% by weight) | $H_2O$ (% by weight) | Stability in storage at 45°C (weeks) |
|---|---|---|---|---|---|---|
| 1 | 50 | p-toluenesulphonic acid | 1 | 5 | 44 | 22 |
| 2 | 50 | '' | 2 | 5 | 43 | >24 |
| 3 | 50 | '' | 3 | 5 | 42 | >24 |
| 4 | 50 | '' | 5 | 5 | 40 | >52 |
| 5 | 50 | '' | 5 | — | 45 | >24 |
| 6 | 50 | formic acid | 5 | 5 | 40 | < 1 |
| 7 | 50 | '' | 5 | — | 45 | < 1 |
| 8 | 50 | tartaric acid | 1 | 5 | 44 | < 2 |
| 9 | 50 | '' | 1 | — | 49 | < 2 |
| 10 | 50 | chloroacetic acid | 1 | — | 49 | < 3 |
| 11 | 50 | bromoacetic acid | 5 | 5 | 40 | < 4 |
| 12 | 50 | acetic acid | 5 | 5 | 40 | < 3 | and then heat treated at for example, 50° to 150°C, preferably 95° to 120°C, simply by treating the impregnated wool with hot air or steaming it. The heat treatment causes the blocking agent to split off and thereby enables the free isocyanate groups to react with the substrate which contains active hydrogen atoms. This takes about 2 to 5 minutes in the preferred temperature range of from 95° to 120°C. The liberated blocking agent may then be removed simply by washing in the same way as the water-soluble stabilizer (the sulphonic acid) according to the invention. The finishing of textiles in general and paper and leather is carried out by analogous methods, taking into account the conventional techniques employed for the particular industries. The permanence of the finishing effect should be particularly mentioned.

EXAMPLE A

Preparation of an aqueous solution of a bisulphite adduct which is stabilized according to the invention.

2.5 kg of an NCO prepolymer, which has been obtained by reacting a propoxylated trimethylolpropane, which has a molecular weight of 3400, with excess hexamethylene diisocyanate and then removing the excess, unreacted hexamethylene diisocyanate, are dissolved in ethyl acetate to form an 80% solution. 2.4 liters ethanol are then added. Finally, a solution of 220 g $NaHSO_3$ in 1.2 liters water is stirred into this solution at room temperature.

The initially milky solution becomes completely clear after 15 to 20 minutes. The organic solvent is then evaporated off under vacuum at a temperature of from 30° to 40°C. The solution obtained in this way is used in the following examples.

General method of procedure:

Solutions stabilized according to the invention are obtained from the above aqueous solution by the addition of varying quantities of p-toluene sulphonic acid (Examples 1 to 5). In Examples 1 to 4, the stabilizer according to the invention is added together with isopropanol, as stabilizing agent. The solids content was adjusted by further addition of water, as indicated.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solution of water-soluble polyisocyanate prepolymer whose isocyanate groups are bisulphite blocked in an aqueous medium containing up to 80 volume percent, based on the total quantity of solvent, of water-miscible organic solvent having a boiling point below 150°C, which solution may be stored at 45°C for more than 10 weeks without decomposition, which contains from 0.5 to 20%, by weight, based on the bisulphite blocked polyisocyanate, of an acid corresponding to the following general formula:

$$R(SO_3H)_n$$

wherein

R represents an aromatic or alkyl aromatic hydrocarbon group containing from 6 to 15 carbon atoms; and n is an integer of from 1 to 3.

2. A process comprising treating textiles, paper and leather with the solution of claim 1.

3. In a solution of water soluble polyisocyanate prepolymer whose isocyanate groups are bisulphite blocked in an aqueous medium containing up to 80 volume percent (based on the total quantity of solvent) of water miscible organic solvent having a boiling point below about 150°C the improvement wherein the solution contains from about 0.5 to 20% by weight (based on the bisulphite blocked prepolymer) of an acid having the following general formula:

$$R(SO_3H)_n$$

wherein

R represents an aromatic or alkyl aromatic hydrocarbon group containing 6 to 15 carbon atoms; and $n$ is an integer of from 1 to 3, whereby the solution may be stored at up to about 45°C for more than 10 weeks without decomposition.

4. In the solution of claim 3 the further improvement wherein the acid present is between about 1 and 10 wt.% (based on the weight of the bisulphite blocked prepolymer) and $n$ is 1.

5. In the solution of claim 4 the further improvement wherein the acid is p-toluene sulphonic acid.

* * * * *